United States Patent
Yoshioka et al.

[11] Patent Number: 5,289,684
[45] Date of Patent: Mar. 1, 1994

[54] CHARGING PRESSURE CONTROL APPARATUS FOR AN INTERNAL COMBUSTION ENGINE WITH A DUAL TURBOCHARGER SYSTEM

[75] Inventors: Mamoru Yoshioka; Kunihiko Nakata, both of Susono; Hiroki Wada, Toyota, all of Japan

[73] Assignee: Toyota Jidosha Kabushiki Kaisha, Toyota, Japan

[21] Appl. No.: 923,251

[22] Filed: Jul. 31, 1992

[30] Foreign Application Priority Data

Aug. 2, 1991 [JP] Japan .................. 3-216522
Aug. 9, 1991 [JP] Japan .................. 3-223668
Apr. 1, 1992 [JP] Japan .................. 4-105293

[51] Int. Cl.$^5$ ................................................ F02B 37/12
[52] U.S. Cl. ........................................ 60/612; 60/600
[58] Field of Search ............... 60/600, 601, 602, 603, 60/612

[56] References Cited

U.S. PATENT DOCUMENTS

| | | | |
|---|---|---|---|
| 3,038,297 | 6/1962 | Kauffmann . | |
| 4,468,928 | 9/1984 | Suzuki | 60/602 |
| 4,474,008 | 10/1984 | Sakurai et al. . | |
| 4,781,027 | 11/1988 | Richter et al. | 60/602 |
| 4,793,140 | 12/1988 | Esch | 60/600 |
| 4,982,567 | 1/1991 | Hashimoto et al. | 60/600 |
| 5,003,781 | 4/1991 | Shibata et al. | 60/600 |
| 5,005,359 | 4/1991 | Tashima et al. | 60/600 |
| 5,035,114 | 7/1991 | Shibata et al. | 60/612 |
| 5,036,663 | 8/1991 | Akagi et al. | 60/612 |
| 5,081,842 | 1/1992 | Sugiyama et al. | 60/612 |
| 5,168,707 | 12/1992 | Yoshioka et al. | 60/612 |
| 5,197,287 | 3/1993 | Okimoto et al. | 60/612 |

FOREIGN PATENT DOCUMENTS 169630  9/1985  Japan .
300017 12/1989  Japan .
119625  5/1990  Japan .

*Primary Examiner*—Michael Koczo
*Attorney, Agent, or Firm*—Cushman, Darby & Cushman

[57] ABSTRACT

A charging pressure control apparatus including a first duty control solenoid valve for controlling the opening degree of an exhaust bypass valve to thereby control a charging pressure during "one-turbocharger-operation", and a second duty control solenoid valve for controlling the opening degree of a waste gate valve to thereby control a charging pressure during "two-turbocharger-operation". The operating conditions at high altitudes of the first duty control solenoid valve and the second duty control solenoid valve are made different from those at low altitudes so that the power characteristic of the turbocharged engine is as good at high altitudes as at low altitudes.

11 Claims, 13 Drawing Sheets

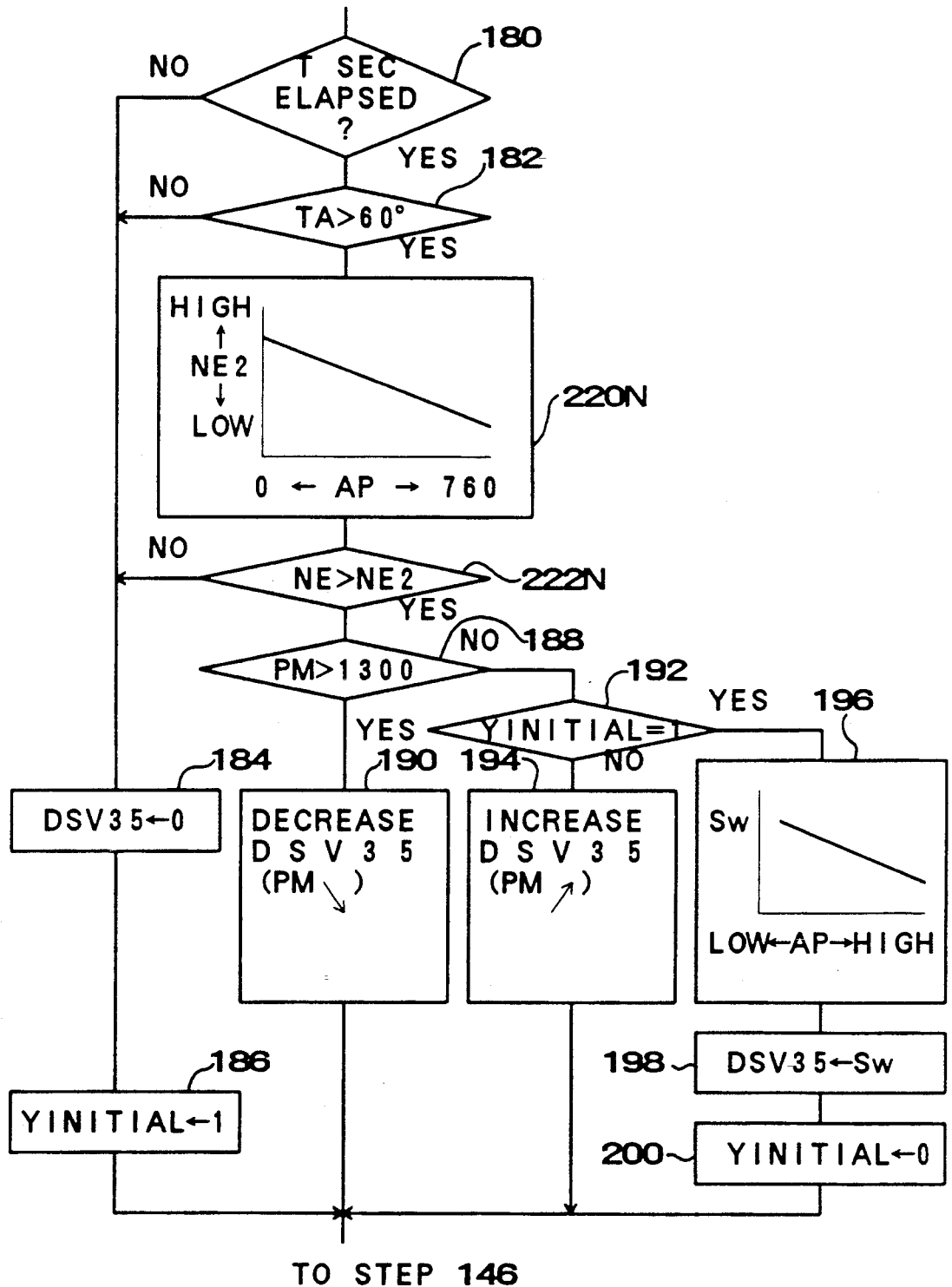

CHARGING PRESSURE CONTROL APPARATUS FOR AN INTERNAL COMBUSTION ENGINE WITH A DUAL TURBOCHARGER SYSTEM

BACKGROUND OF THE INVENTION

1. Field of the Invention

The present invention relates to a charging pressure control apparatus for an internal combustion engine with a dual turbocharger system which can improve engine output characteristics at high altitudes.

2 Description of the Related Art

An internal combustion engine with a dual turbocharger system is shown in Japanese Patent Publication HEI 3-138,420 (which corresponds to U.S. Pat. No. 5,081,842).

The dual turbocharger system includes a first turbocharger operated at all intake air quantities and a second turbocharger operated solely at large intake air quantities. More particularly, an intake switching valve is installed in a portion of the intake conduit downstream of the compressor of the second turbocharger and an exhaust switching valve is installed in a portion of the exhaust conduit downstream of the turbine of the second turbocharger. When the intake switching valve and the exhaust switching valve are closed, operation of the second turbocharger is stopped and only the first turbocharger is in operation. When the intake switching valve and the exhaust switching valve are open, both the second turbocharger and the first turbocharger are in operation. To make the switching from "one-turbocharger-operation" to "two-turbocharger-operation" smooth, an exhaust bypass conduit is provided to bypass the exhaust switching valve and an exhaust bypass valve is installed in the exhaust bypass conduit. Before the intake switching valve and the exhaust switching valve are opened, the exhaust bypass valve is opened so that the second turbocharger is pre-rotated.

The exhaust bypass valve is also used as means for controlling the charging pressure in "one-turbocharger-operation" as described below. More particularly, the exhaust bypass valve is operated with a diaphragm actuator. The charging pressure is introduced to the diaphragm chamber of the diaphragm actuator. The diaphragm chamber also communicates with the intake line upstream of the turbocharger compressor or atmosphere via a duty control solenoid valve. By controlling the duty control solenoid valve, the degree of opening of the exhaust bypass valve is controlled whereby the amount of exhaust gas leaking to the second turbocharger turbine without flowing to the first turbocharger turbine is controlled so that the rotational speed of the first turbocharger and the charging pressure in "one-turbocharger-operation" are controlled.

The charging pressure control in "two-turbocharger-operation" is performed by a waste gate valve which is installed in a bypass conduit bypassing the first turbocharger turbine. The waste gate valve is operated by an actuator which in turn is operated by a duty control solenoid valve. By controlling the duty control valve, the degree of opening of the waste gate valve is controlled whereby the amount of exhaust gas bypassing the first turbocharger turbine is controlled so that the rotational speed of the first turbocharger and the charging pressure in "two-turbocharger-operation" are controlled.

In FIG. 15, full line L1 shows the charging pressure characteristic at low altitudes in accordance with the above-described conventional turbocharged engine. More particularly, after the engine starts-up, the intake pressure rises in accordance with an increase in the engine speed. When the intake pressure reaches a feed-back control beginning pressure Pc, the feed-back control of the duty control solenoid valve for the exhaust bypass valve starts so that the charging pressure is controlled to an objective pressure Po (constant in absolute pressure). Before the engine speed increases and the intake gas quantity Q finally reaches a predetermined value (for example, 5,500 l/min), the charging pressure is controlled by the exhaust bypass valve. When the intake air quantity reaches the predetermined value, the engine operation is switched from "one-turbocharger-operation" to "two-turbocharger-operation" accompanied by a sudden decrease in the charging pressure. Passing through the transitional range, the charging pressure is controlled to the constant pressure Po by the waste gate valve.

However, when the turbocharged engine is used at high altitudes, the charging pressure characteristic changes from full line L1 to broken line L2 (FIG. 15), because the intake air is lean in density, and the following problems are encountered:

(a) When the charging pressure changes from Pc to P0, the charging pressure increase is slow compared to that at low altitudes, which degrades the acceleration characteristic at high altitudes.

(b) When the operation changes from "one-turbocharger-operation" to "two-turbocharger-operation", the charging pressure decreases to a greater extent at high altitudes than at low altitudes, which causes a large torque shock.

(c) If the intake pressure does not reach the feed back control beginning pressure Pc at high altitudes (see broken line L3 in FIG. 15), the charging pressure cannot be controlled to the constant pressure P0, which will deteriorate the charging characteristic at high altitudes.

SUMMARY OF THE INVENTION

An object of the invention is to provide a charging pressure control apparatus for an internal combustion engine with a dual turbocharger system wherein the charging pressure rises from Pc to P0 at high altitudes as rapidly as at low altitudes.

Another object of the invention is to provide a charging pressure control apparatus for an internal combustion engine with a dual turbocharger system wherein a decrease in the charging pressure during the transition from "one-turbocharger-operation" to "two-turbocharger-operation" at high altitudes is suppressed to the same extent as a decrease at low altitudes.

Yet another object of the invention is to provide a charging pressure control apparatus for an internal combustion engine with a dual turbocharger system wherein the intake pressure can reach the feed back control beginning pressure Pc even at high altitudes.

BRIEF DESCRIPTION OF THE DRAWINGS

The above described objects and other objects, features, and advantages of the present invention will become more apparent and will be more readily appreciated from the following detailed description of the preferred embodiments of the invention taken in conjunction with the accompanying drawings, in which:

FIG. 14 is a partial flow chart of the control of a waste gate valve in accordance with the sixth embodiment of the invention.

DETAILED DESCRIPTION OF THE PREFERRED EMBODIMENTS

Figure 1:
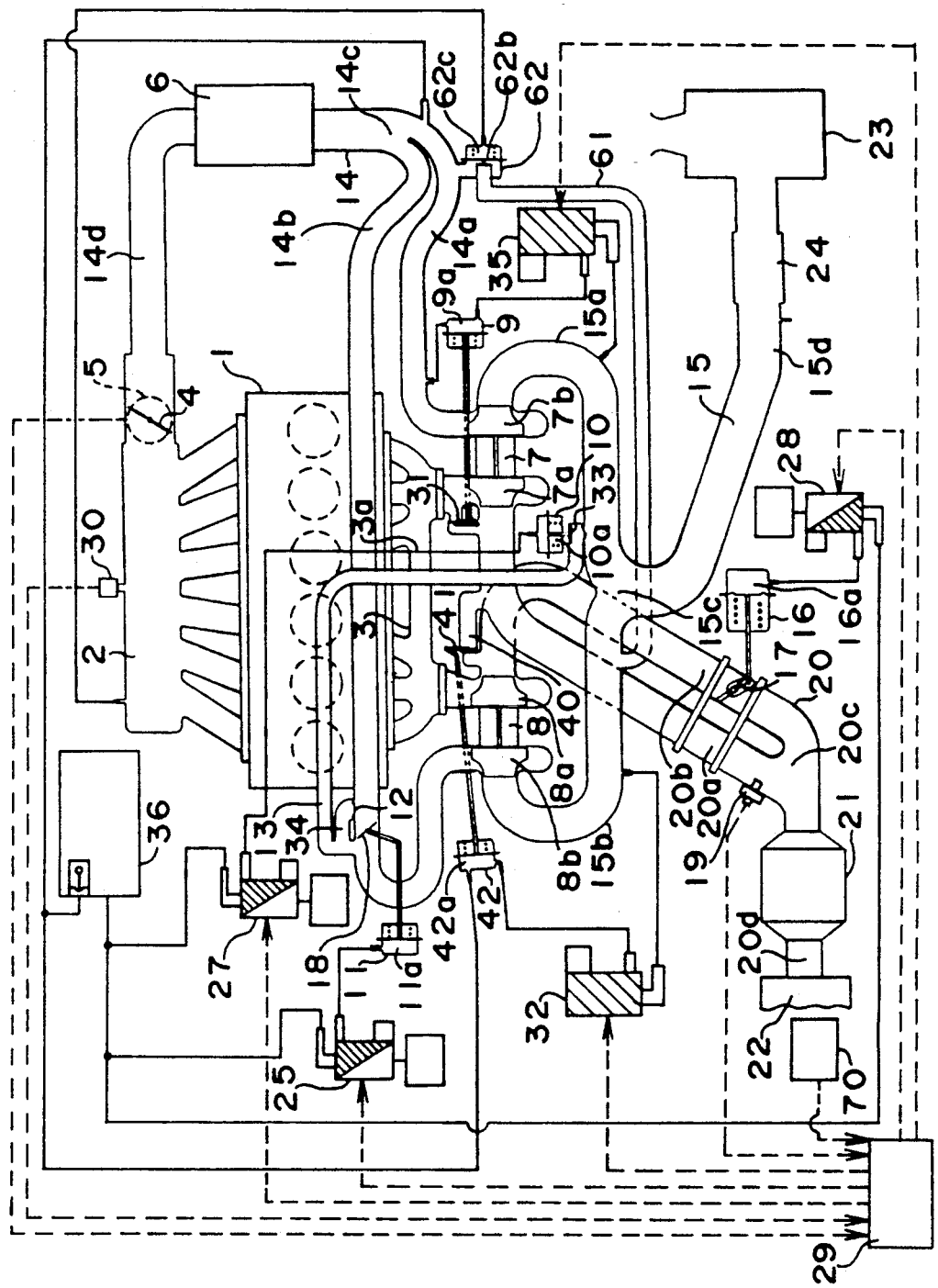
FIG. 1 is a schematic view of the charging pressure control apparatus for an internal combustion engine with a dual turbocharger system in accordance with the invention.

FIG. 1 illustrates structure common to all embodiments. Thus, common structures will be described first.

As illustrated in FIG. 1, a charging pressure control apparatus for an internal combustion engine with a dual turbocharger system in accordance with all embodiments of the present invention includes a multi-cylinder engine. As an example, FIG. 1 depicts a six-cylinder internal combustion engine 1 with an air intake and an exhaust outlet. The cylinders of the engine 1 are grouped into two groups. An exhaust manifold 3 is connected with the engine exhaust outlets and includes a first portion connected with the first group of engine cylinders and a second portion connected with the second group of engine cylinders. The first and second portions of the exhaust manifold 3 communicate with each other via a connecting conduit 3a.

A first turbocharger 7 and a second turbocharger 8 are positioned in parallel with each other with respect to the engine 1. The first turbocharger 7 is operated throughout all intake air quantities, and the second turbocharger 8 is operated only at large intake air quantities. The first turbocharger 7 includes a turbine 7a and a compressor 7b driven by the turbine 7a. Similarly, the second turbocharger 8 includes a turbine 8a and a compressor 8b driven by the turbine 8a. The turbine 7a is connected with the first portion of the exhaust manifold 3 and the turbine 8a is connected with the second portion of the exhaust manifold 3. As a result, the first and second turbines 7a and 8a are connected to the engine exhaust outlet via the exhaust manifold 3. The compressor 7b and the compressor 8b are connected with the air intake of the engine 1 via a portion of an intake line.

The intake line connected with the engine air intake includes a first intake passage 15 positioned upstream of the compressors 7b and 8b and a second intake passage 14 positioned downstream of the compressors 7b and 8b. The first intake passage 15 includes a first intake pipe 15a located upstream of and connected with the compressor 7b, a second intake pipe 15b located upstream of and connected with the compressor 8b, a connecting portion 15c where the first intake pipe 15a and the second intake pipe 15b join each other, and a common intake pipe 15d located upstream and connected with the connecting portion 15c. Similarly, the second intake passage 14 includes a first intake conduit 14a located downstream of and connected with the compressor 7b, a second intake conduit 14b located downstream of and connected with the compressor 8b, a connecting portion 14c where the first intake conduit 14a and the second intake conduit 14b join each other, and a common intake conduit 14d connecting the connecting portion 14c with the engine air intake. In the common intake pipe 15d, an air cleaner 23 and an air flow meter 24 are installed in that order in the downstream direction. In the common intake conduit 14d, an intercooler 6, a throttle valve 4, and a surge tank 2 are installed in that order in the downstream direction.

An exhaust line 20, connected to the engine exhaust outlets, includes a first exhaust conduit 20a connected to the first portion of the exhaust manifold 3, a second exhaust conduit 20b connected to the second portion of the exhaust manifold 3, a connecting portion 20c where the first exhaust conduit 20a and the second exhaust conduit 20b join each other, and a common exhaust pipe 20d located downstream of and connected to the connecting portion 20c. Turbines 7a and 8a are positioned within the first exhaust conduit 20a and the second exhaust conduit 20b, respectively. In the exhaust pipe 20d, a catalytic converter 21 and an exhaust muffler 22 are installed in that order in the downstream direction. Furthermore, an oxygen sensor 19 is installed at or in the vicinity of the connecting portion 20c.

For the purpose of switching between "one-turbocharger-operation," where only the first turbocharger 7 operates at small to medium intake air quantities, and "two-turbocharger-operation," where both the first turbocharger 7 and the second turbocharger 8 operate at large intake air quantities, an exhaust switching valve 17 is installed in the second exhaust conduit 20b downstream of the turbine 8a, and an intake switching valve 18 is installed in the second intake conduit 14b downstream of the compressor 8b. When both the exhaust switching valve 17 and the intake switching valve 18 are closed, the operation of the second turbocharger 8 is stopped and only the first turbocharger 7 is in operation. In contrast, when both the exhaust switching valve 17 and the intake switching valve 18 are open, both the first turbocharger 7 and the second turbocharger 8 are in operation.

For the purpose of minimizing the shock which typically accompanies the transition from "one-turbocharger-operation" to "two-turbocharger-operation", the second turbocharger 8 should be run-up before it is fully rotated. An exhaust bypass conduit 40 is provided which bypasses the exhaust switching valve 17, and the second turbocharger 8 is run-up by opening an exhaust bypass valve 41 installed in the exhaust bypass conduit 40. More particularly, when the exhaust bypass valve 41 is open, a relatively small amount of exhaust gas flows through the exhaust bypass conduit 40 to run-up the second turbocharger 8. When the exhaust switching valve 17 is then opened, the rotational speed of the second turbocharger 8 is increased from the run-up rotational speed to a "two-turbocharger-operation" rotational speed. As a result, the reduced increment in the rotational speed effectively attenuates the transition shock.

When the second turbocharger 8 is preliminarily rotated and the intake switching valve 18 is closed, a portion of the pressurized air located in the second intake conduit 14b between the compressor 8b and the intake switching valve 18, will leak upstream through the compressor 8b and flow to a portion of the second intake pipe 15b upstream of the compressor 8b. This leaked air will then again be driven by the compressor 8b and compressed into the portion of the intake conduit downstream of the compressor 8b. This leakage and re-pressurization of the intake air repeats and undesirably increases the temperature of the intake air and thus, the temperature of the impeller of the compressor 8b itself. To prevent such temperature increases, an intake bypass conduit 13 is provided to allow the compressed air to bypass the compressor 8b of the second turbocharger 8. More particularly, the intake bypass conduit 13 connects the portion of the second intake conduit 14b positioned between the compressor 8b and the intake switching valve 18 with the first intake passage 15. An intake bypass valve 33 is installed in and is adapted to open and close the intake bypass conduit 13. When the second turbocharger 8 is preliminarily rotated, the intake bypass valve 33 is opened to minimize the intake air temperature increase.

An intake switching valve bypass conduit 34 is provided to connect a portion of the second intake conduit 14b positioned upstream of the intake switching valve 18 with a portion of the intake conduit 14b positioned downstream of the intake switching valve 18 to bypass the intake switching valve 18. A one-way check valve 12 is installed in the intake switching valve bypass conduit 34. The check valve 12 permits the intake air to flow from the portion of the second intake conduit 14b positioned upstream of the intake switching valve 18 toward the portion of the second intake conduit 14b positioned downstream of the intake switching valve 18. As a result, when the intake switching valve 18 is closed and the compressor outlet pressure of the second turbocharger 8 exceeds a compressor outlet pressure of the first turbocharger 7, the check valve 12 opens the intake switching valve bypass conduit 34 and permits the intake air to flow downstream.

Further, the turbine 7a is provided with a waste gate valve 31 which is installed in a first turbocharger turbine bypass conduit bypassing the first turbocharger turbine 7a. Additionally, a positive pressure tank 36 is connected with a portion of the common intake conduit 14d upstream of the intercooler 6 and holds a charging pressure therein.

During a rapid deceleration, the throttle valve 4 is rapidly closed. As a result, the intake air pressure upstream of the throttle valve 4 may increase, which then produces a pressure reflection at the throttle valve 4. The pressure reflection causes a surging and a sound at the compressor 7b during "one-turbocharger-operation" and at the compressors 7b and 8b during "two-turbocharger-operation". To prevent such surging, an air bypass conduit 61 is connected at one end to a portion of the second intake passage 14 positioned upstream of the throttle valve 4 and at the other end to a portion of the first intake passage 15. An air bypass valve 62 is installed in the air bypass conduit 61 and is adapted to open and close the air bypass conduit 61 during a rapid deceleration.

The air bypass valve 62 includes a diaphragm 62b having a first side and an opposite second side. The first side of the diaphragm 62b is connected to the interior of the air bypass conduit 61 so that the charging pressure transmitted through the air bypass conduit 61 directly acts on the diaphragm 62b from the first side of the diaphragm 62b to open the air bypass conduit 61. Since the valve opening force acts directly on the diaphragm 62b, the air bypass valve 62 has a quick response to effectively suppress a surging during a rapid deceleration. The air bypass valve 62 also includes a diaphragm chamber 62c on the second side of the diaphragm 62b. The diaphragm chamber 62c is connected to a portion of the intake line downstream of the throttle valve 4. The air bypass valve 62 automatically opens and closes without being controlled by a computer.

Various actuators operate the above-described valves except the air bypass valve 62. As shown in FIG. 1, actuator 9 operates the waste gate valve 31, actuator 10 operates the intake bypass valve 33, actuator 11 operates the intake switching valve 18, actuator 16 operates the exhaust switching valve 17, and actuator 42 operates the exhaust bypass valve 41.

Each of these actuators is constructed of a diaphragm-type actuator. The actuator 16 includes a diaphragm chamber 16a, the actuator 10 includes a diaphragm chamber 10a, the actuator 11 includes a diaphragm chamber 11a, the actuator 42 includes a diaphragm chamber 42a, and the actuator 9 includes a diaphragm chamber 9a. Each diaphragm chamber 16a, 10a, 11a, 42a, and 9a communicates with the positive pressure tank 36 or a portion of the second intake passage 14 upstream of the throttle valve 4 so that the charging pressure is introduced to each diaphragm chamber The diaphragm chamber 9a and 42a also communicate with the first intake passage 15 so that atmospheric pressure can be introduced to the diaphragm chambers 9a and 42a.

Various three-way or two-way solenoid valves 25, 27, 28, 32, and 35 respectively switch the actuators 11, 10, 16, 42, and 9 on and off. The two-way solenoid valve 32 for operating the actuator 42 of the exhaust bypass valve 41 and the two-way solenoid valve 35 for operating the actuator 9 of the waste gate valve 31 are duty-control valves. The opening degree of a duty control valve can be controlled by the duty ratio thereof as is well known. The duty control solenoid valve 32 is installed in a pressure bleed line connected between the diaphragm chamber 42a and the first intake passage 15. The duty control solenoid valve 35 is installed in a pressure bleed line connected between the diaphragm chamber 9a and the first intake passage 15. These solenoid valves 25, 27, 28, 32 and 35 operate according to the instructions from an engine control computer 29 (or an electronic control unit).

In this instance, an "ON" setting of the three-way solenoid valve 25 actuates the actuator 11 to open the intake switching valve 18 and an "OFF" setting of the three-way solenoid valve 25 actuates the actuator 11 to close the intake switching valve 18. Similarly, an "ON" setting of the three-way solenoid valve 28 actuates the actuator 16 to open the exhaust switching valve 17 and an "OFF" setting of the three-way solenoid valve 28 actuates the actuator 16 to close the exhaust switching valve 17. An "ON" setting of the three-way solenoid valve 27 actuates the actuator 10 to close the intake bypass valve 33 and an "OFF" setting of the three-way solenoid valve 27 actuates the actuator 10 to open the intake bypass valve 33. An increase control of the duty ratio of the two-way duty control solenoid valve 32 actuates the actuator 42 to open the exhaust bypass valve 41 and a decrease control of the duty ratio of the two-way duty control solenoid valve 32 actuates the actuator 42 to close the exhaust bypass valve 41. Similarly, an increase control of the duty ratio of the two-way duty control solenoid valve 35 actuates the actuator 9 to open the waste gate valve 31 and a decrease control of the duty ratio of the two-way duty control solenoid valve 35 actuates the actuator 9 to close the waste gate valve 31.

Various sensors for sensing the engine operating conditions are provided and the outputs of the sensors are fed to the engine control computer 29 (or the electronic control unit). More particularly, the various sensors include an intake pressure sensor 30, a throttle opening degree detecting sensor 5, an intake air quantity detecting sensor such as an air flow meter 24, an atmospheric pressure detecting sensor 70, the aforementioned oxygen sensor 19, an engine speed or crank angle sensor (not shown), and a vehicle speed sensor (not shown).

Figure 2:
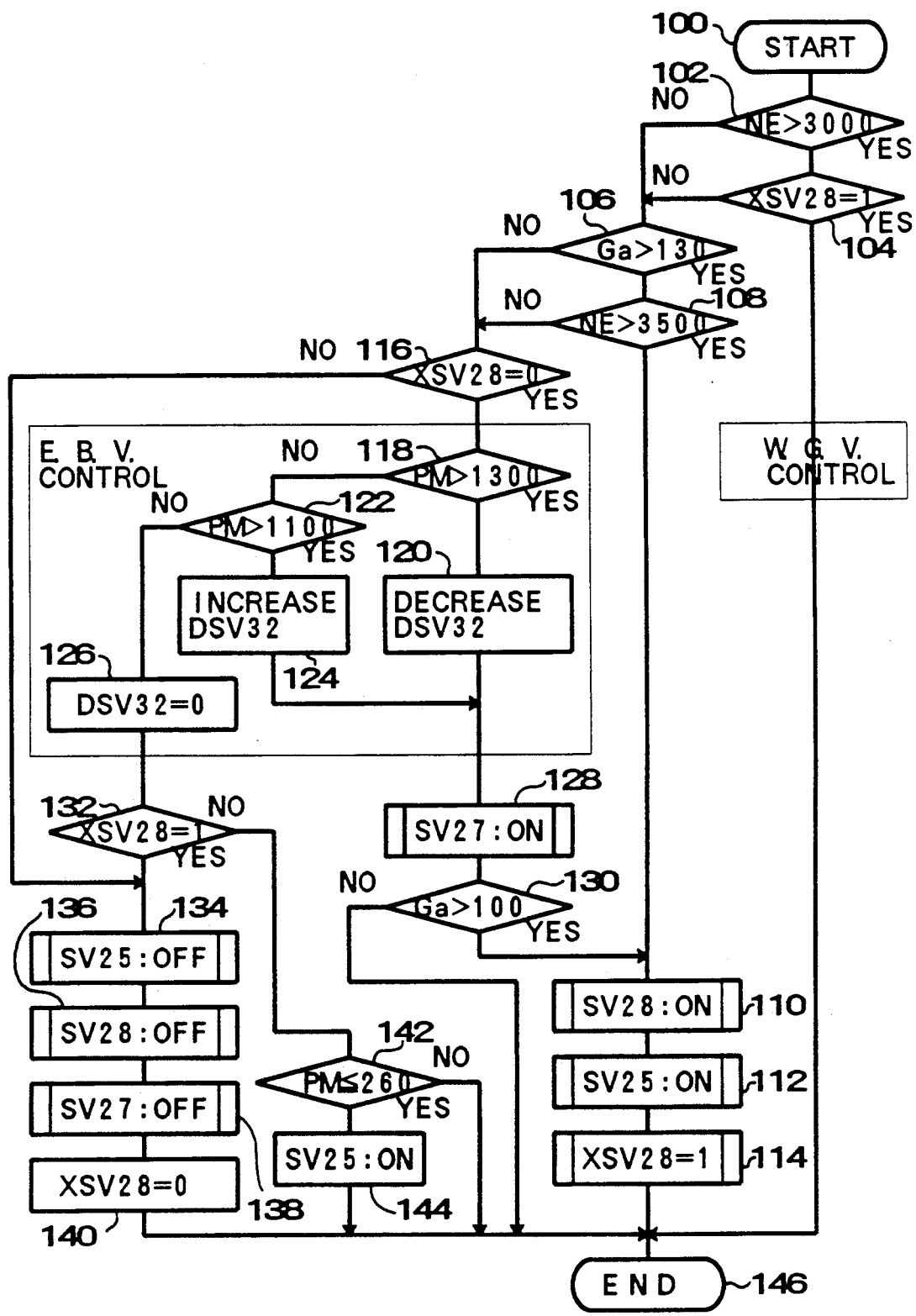
FIG. 2 is a flow chart illustrating the basic operation control of various valves of the apparatus of FIG. 1.

The engine control computer 29 (or the electronic control unit) includes a central processor unit (CPU), a read-only memory (ROM), a random access memory (RAM), an input and output interface (I/0 interface), and an analog/digital convertor (A/D convertor) like a typical micro computer. The program of FIG. 2 is stored in the ROM and is fed into the CPU where the routine is executed to operate the above-described valves and actuators.

Basic control structures and operation of the turbocharged engine will now be explained with reference to FIG. 2. The routine of FIG. 2 starts at step 100 at predetermined time intervals. At step 102, the routine determines whether the current engine speed NE is larger than a predetermined speed (for example, 3,000 rpm). At step 106, the routine determines whether the current intake air quantity Ga is larger than a predetermined air quantity (for example, 130 g/sec). When the intake air quantity Ga surpasses 130 g/sec for the first time, the routine proceeds from step 100 to step 106 via step 102. The routine then proceeds to step 110 via step 108, where the solenoid valve 28 is switched to "ON" to open exhaust switching valve 17. Subsequently, the routine proceeds to step 112 where the solenoid valve 25 is switched to "ON" to open the intake switching valve 18 to produce the "two-turbocharger-operation". The routine proceeds to step 114 where an exhaust switching valve opening flag XSV28 is set to "1". The cycle ends at step 146. During the subsequent cycles, if the engine speed NE is greater than 3,000 rpm, the routine proceeds from step 100 to step 104 via step 102.

Since flag XSV28 was set to "1" at step 114 during the first cycle, the routine proceeds from step 104 to step 146 via a waste gate valve control for controlling the charging pressure in "two-turbocharger-operation" which will be described in more detail hereinafter, and at step 146 the cycle ends.

When the current intake air quantity Ga is less than the predetermined intake air quantity (for example, 130 g/sec) or changes from a quantity greater than 130 g/sec to a quantity less than 130 g/sec, the routine proceeds from step 100 to step 106 via step 102 and further to step 116. When the intake air quantity decreases to a quantity less than 130 g/sec, the flag XSV28 has previously been set to "1". Therefore, in the first cycle after the intake air quantity drop, the routine proceeds from step 116 to step 134 where the solenoid valve 25 is switched to "OFF" to close the intake switching valve 18. At step 136, the solenoid valve 28 is switched to "OFF" to close the exhaust switching valve 17 producing the "one-turbocharger-operation". At step 138, the solenoid valve 27 is switched to "OFF" to open the intake bypass valve 33. At step 140, flag XSV28 is set to "0" to indicate that the exhaust switching valve 17 is closed. Finally, step 146 ends the cycle.

Since flag XSV28 is set at "0", in the subsequent cycles, the routine proceeds from step 116 to step 118. Steps 118 to 126 are steps for controlling the exhaust bypass valve 41. When the current intake pressure PM is less than a predetermined pressure Pc for beginning feed back control of the duty control selenoid valve 32 (for example, 1100 mm Hg in absolute pressure) at low or intermediate engine loads, the routine proceeds from step 118 to step 126 via step 122, where the duty ratio DSV32 of the two-way duty control solenoid valve 32 is set to 0% to close the exhaust bypass valve 41. Then, the routine proceeds to step 132, and then, since flag XSV28 is set to "0", the routine proceeds to step 146 via steps 142 and 144, where the cycle ends. At step 142, it is determined whether the intake pressure is equal to or less than a predetermined negative pressure (for example, 260 mmHg in absolute pressure). If the intake pressure is equal to or less than the predetermined pressure and therefore the engine load is at low loads, the routine proceeds to step 144 where the solenoid valve 25 is switched to "ON" to open the intake switching valve 18 so that the intake air can be sucked through both the first turbocharger compressor 7b and the second turbocharger compressor 8b to improve the acceleration characteristic from the low engine load.

When the current intake air quantity Ga increases and approaches 100 g/sec, the intake pressure PM exceeds 1,100 mm Hg. As a result, the exhaust bypass valve 41 must be open to run-up the second turbocharger 8 to obtain a smooth transition from the "one-turbocharger-operation" to the "two-turbocharger-operation" and to control the charging pressure to a predetermined objective pressure Po (for example, 1,300 mmHg in absolute pressure). In such a condition, the routine proceeds from step 116 to step 124 via steps 118 and 122, where the duty ratio of the two-way duty control solenoid valve 32 is increased by a predetermined amount (for example, 2%) per cycle so that the exhaust bypass valve 41 opens gradually. In this instance, if the duty ratio exceeds 100% at step 124, the duty ratio is cut to 100% at step 126. The routine then proceeds from step 124 to step 128, where the three-way solenoid valve 27 is switched to "ON" to close the intake bypass valve 33. Then, the routine proceeds to step 130, and if the current intake air quantity Ga exceeds a predetermined amount (for example 100 g/sec), the routine proceeds to steps 110 and 112 to produce the "two-turbocharger-operation". However, if the current intake air quantity Ga does not exceed 100 g/sec, the second turbocharger 8 has not yet been run-up sufficiently, and therefore, the routine proceeds from step 130 to step 146 where the cycle ends. If PM is determined to be greater than the predetermined objective pressure (for example, 1,300 mmHg in absolute pressure) at step 118, the duty ratio DSV32 of the two-way solenoid valve 32 is decreased so that the charging pressure is controlled to the predetermined objective pressure Po (for example, 1,300 mmHg in absolute pressure). In this instance, if the duty ratio is less than 0% at step 120, the duty ratio is cut to 0% at step 120.

Charging pressure control specific to each embodiment of the invention will now be explained.

Figure 3:
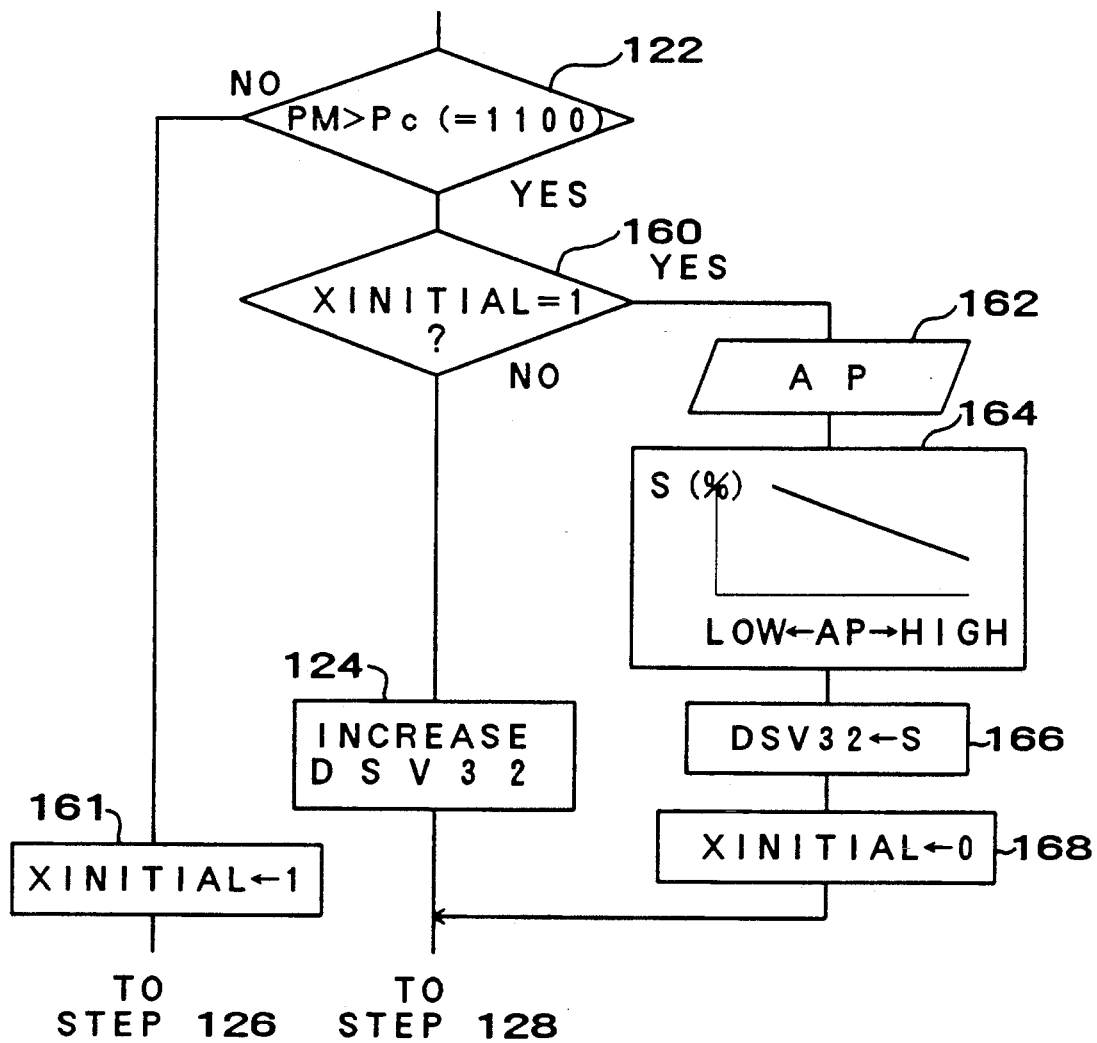
FIG. 3 is a partial flow chart of the control of an exhaust bypass valve in accordance with a first embodiment of the invention.
Figure 4:
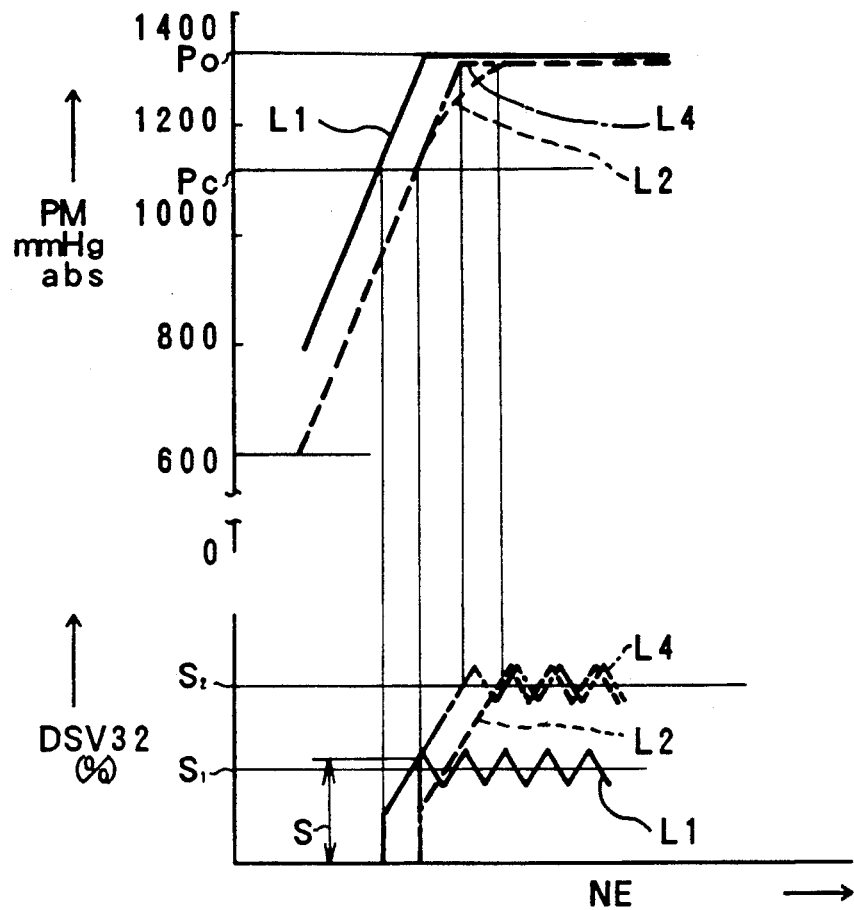
FIG. 4 is a graphical representation of the charging pressure control characteristic in accordance with the first embodiment of the invention.

The first embodiment relates to an improvement in the charging pressure control in "one-turbocharger-operation" and is illustrated in FIGS. 3 and 4. In the first embodiment, the steps 122 and 124 of FIG. 2 are replaced by the partial control routine of FIG. 3.

In FIG. 3, step 122 determines whether or not the intake pressure PM is greater than a predetermined duty control beginning pressure Pc (for example, 1,100 mmHg in absolute pressure). If PM is not larger than Pc, the routine proceeds to step 161 where flag XINITIAL is set to "1" and then proceeds to step 126 (see FIG. 2). If PM is larger than Pc at step 122, the routine proceeds to step 160, where it is determined whether the present cycle is a first cycle after PM exceeds Pc, that is, whether flag XINITIAL is "1". If the present cycle is a first cycle, the routine proceeds to step 162 where the atmospheric pressure in absolute pressure (for example, 600 mmHg) is entered. Then, at step 164, an initial duty ratio S is determined using a predetermined map. In the map, the lower the atmospheric pressure AP is (the higher the altitude is), the higher the initial duty ratio S is. Then, the routine proceeds to step 166, where the duty ratio DSV32 is set to S. Then, at step 168, flag XINITIAL is reset to "0" and the routine proceeds to step 128 (see FIG. 2). In subsequent cycles, since flag XINITIAL is set at "0", the routine proceeds from step 160 to step 124, where duty ratio DSV32 is increased by a predetermined value (for example, 2%). Then, the routine proceeds to step 128 (see FIG. 2). In the routine of FIG. 3, steps 160–168 constitute means for setting an initial duty ratio of a duty control solenoid valve for controlling an opening degree of the exhaust bypass valve 41 to a large value S at high altitudes.

FIG. 4 illustrates an improvement in the charging pressure increasing characteristic in accordance with the first embodiment of the invention. In FIG. 4, full line L1 illustrates the characteristic at low altitudes, broken line L2 illustrates the characteristic of a charging pressure control apparatus having a control routine without steps 160, 162, 164, 166, and 168 of FIG. 3, and one-dotted chain line L4 illustrates the characteristic of the charging pressure control apparatus having the control routine of FIG. 3.

At low altitudes, intake pressure PM rises from 760 mmHg and reaches Pc. When PM reaches Pc, the duty ratio DSV32 of the duty control solenoid valve 32 begins to increase. At the same time, the exhaust bypass valve 41 begins to open and then the opening degree of the exhaust bypass valve 41 increases. When the increasing charging pressure PM reaches the objective pressure Po, the increasing duty ratio DSV32 reaches S1. By controlling the duty ratio DSV32 to the value S1, the charging pressure PM is controlled to Po.

At high altitudes, the intake pressure rises from a low absolute pressure, for example, 600 mmHg toward the constant objective pressure Po and finally reaches the feed back control beginning pressure Pc. If the routine of the apparatus does not include steps 160–168, the duty ratio DSV32 starts at 0% and increases. Since air is lean at high altitudes, a greater intake air amount must be supplied in order to reach the objective pressure Po than at low altitudes. Therefore, the duty ratio DSV32 of the duty control solenoid valve 32 must be set at a value S2 at high altitudes, which is higher than S1 for a low altitude. Thus, at high altitudes, it takes longer (time period Th) for the duty ratio DSV32 to reach S2 than at low altitudes. As a result, the increase in the charging pressure PM is slow at high altitudes, as shown by broken line LS2.

However, since the routine of the charging pressure control apparatus in accordance with the first embodiment of the invention is provided with steps 160–168, the duty ratio DSV32 of the duty control solenoid valve 32 starts at S when PM reaches Pc. As a result, duty ratio DSV32 can rise from S to S2 in a shorter period of time than in the case where DSV32 has to rise from 0 to S2. When DSV32 reaches S2, PM reaches Po. Therefore, the intake pressure PM can reach the objective pressure Po in a shorter period of time than in the case where DSV has to increase from 0, as shown by one dotted line L4 in FIG. 4. Accordingly, the intake pressure can reach the objective charging pressure Po quickly and the output characteristic in "one-turbo-charger-operation" is improved.

Figure 6:
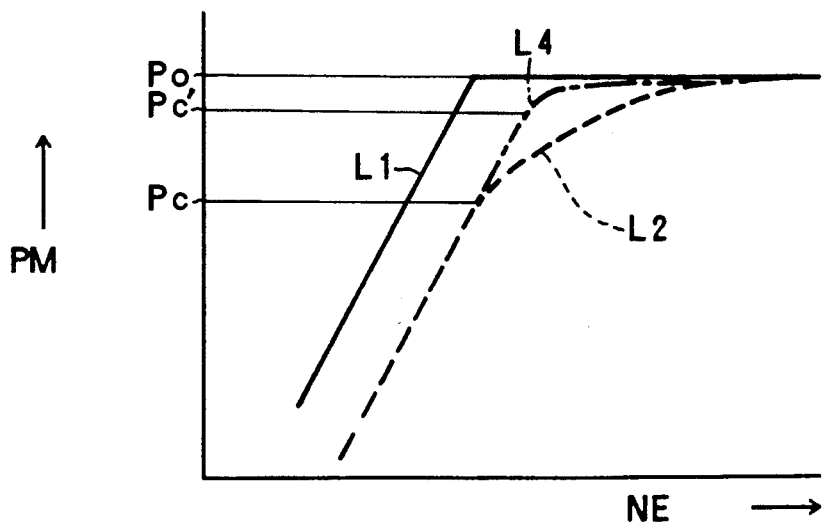
FIG. 6 is a graphical representation of the charging pressure control characteristic in accordance with the second embodiment of the invention.
Figure 5:
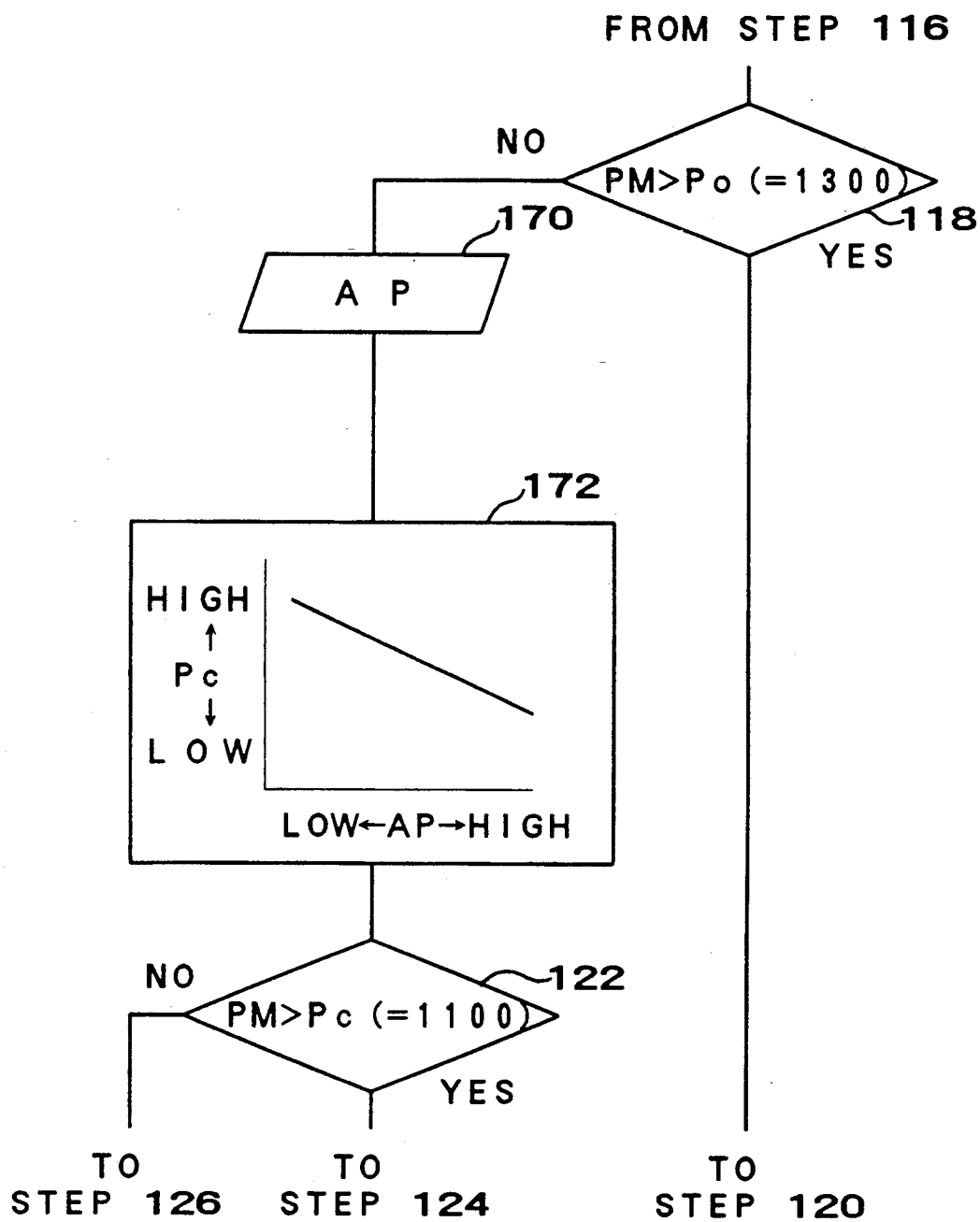
FIG. 5 is a partial flow chart of the control of an exhaust bypass valve in accordance with a second embodiment of the invention.

The second embodiment of the invention relates to an improvement in the charging pressure control in "one-turbocharger-operation" and is illustrated in FIGS. 5 and 6. In the second embodiment, steps 170 and 172 are added between steps 118 and 122 of FIG. 2, as shown in FIG. 5.

More particularly, in FIG. 5, it is determined whether or not the instant intake pressure PM is greater than the predetermined objective pressure (for example, 1,300 mmHg). If PM is greater than Po, the routine proceeds to step 120 (see FIG. 2). If PM is equal to or less than Po, the routine proceeds to step 170, where the instant atmospheric pressure AP is entered. Then, at step 172, a charging pressure feed back control beginning pressure Pc is determined based on the instant atmospheric pressure AP, using a map. In the map, the lower AP in absolute pressure is, the higher Pc in absolute pressure is. Then, the routine proceeds to step 122, where it is determined whether the instant intake pressure PM is greater than Pc. If PM is greater than Pc, the routine proceeds to step 124 (see FIG. 2), and if PM is equal to or less than Pc, the routine proceeds to step 126 (see FIG. 2). In the routine, steps 170 and 172 constitute means for delaying the beginning the feed back control of the exhaust bypass valve 41 at high altitudes.

FIG. 6 illustrates an improvement in the charging pressure rising characteristic in accordance with the second embodiment of the invention. In FIG. 6, full line L1 illustrates the characteristic at low altitudes, broken line L2 illustrates the characteristic of an apparatus having a control routine without steps 170 and 172 of FIG. 5, and one-dotted chain line L4 illustrates the characteristic of the apparatus having the routine of FIG. 5.

At low altitudes, when the intake pressure PM increases and reaches Pc, the feed back control of the charging pressure by the duty control solenoid valve 32 begins. With the feed back control, the charging pressure is controlled to the objective charging pressure Po.

At high altitudes, if the routine of the apparatus does not have steps 170 and 172, the charging pressure rising characteristic is degraded as shown by broken line LS2, as discussed above with reference to the first embodiment.

However, since the routine of the apparatus in accordance with the second embodiment has steps 170 and 172, the feed back control beginning pressure Pc is set to a higher value Pc' (higher than Pc but lower than Po), and the beginning of the feed back control is delayed. As a result, the intake pressure or charging pressure rising characteristic L4 at high altitudes approaches to the characteristic L1 at low altitudes as shown in FIG. 6, and the output characteristic at high altitudes is improved.

Figure 7:
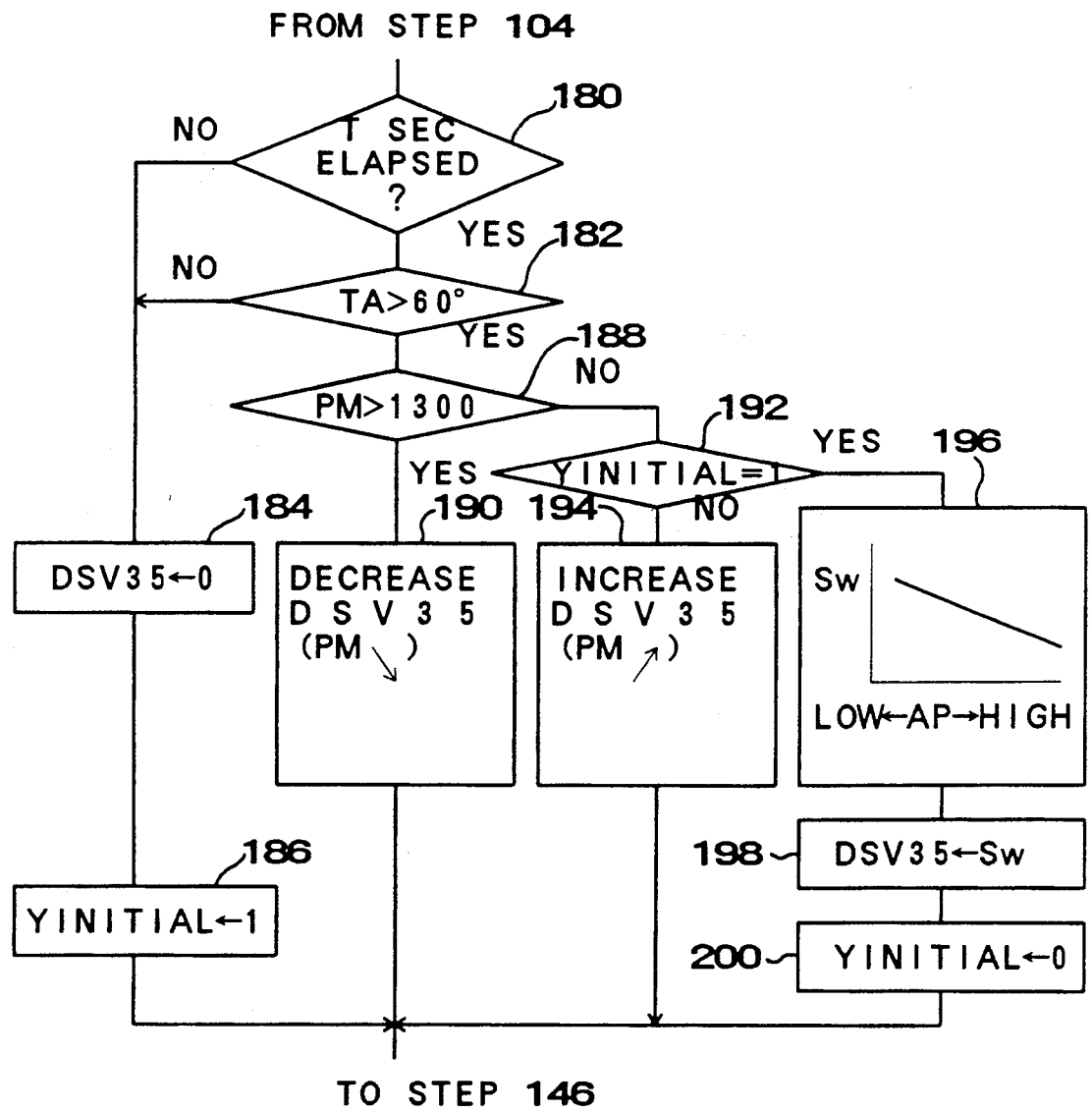
FIG. 7 is a partial flow chart of the control of a waste gate valve in accordance with a third embodiment of the invention.
Figure 8:
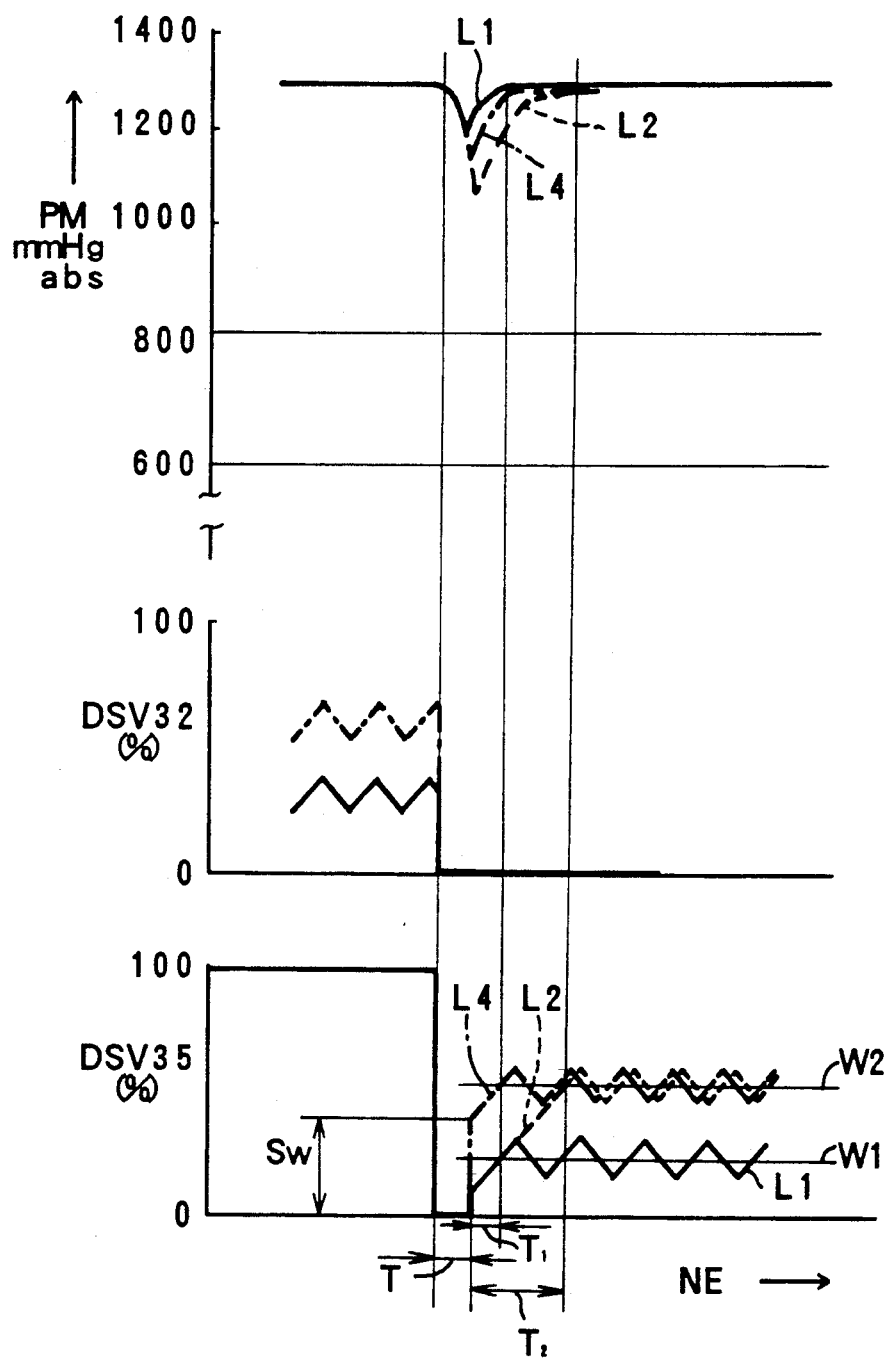
FIG. 8 is a graphical representation of the charging pressure control characteristic in accordance with the third embodiment of the invention.

The third embodiment of the invention relates to an improvement in the charging pressure control by the waste gate valve 31 in "two-turbocharger-operation" and is illustrated in FIGS. 7 and 8. In the third embodiment, a partial routine of FIG. 7 is added between steps 104 and 146 of FIG. 2.

In FIG. 7, the routine proceeds from step 104 (see FIG. 2) to step 180, where it is determined whether or not a predetermined period of time T (for example, 1 second) has elapsed since flag XSV28 (exhaust switching valve opening indicating flag) changed from "0" to "1". If time period T has not passed, the routine proceeds to step 184 where a duty ratio DSV35 of the duty control solenoid valve 35 is set to a small duty ratio (for example, zero). Then, the routine proceeds to step 186 where flag YINITIAL, which indicates whether the instant cycle is a first cycle after T seconds has passed after changing XSV28 to "1", is set to "1", and then the routine proceeds to step 146 (see FIG. 2). If T seconds has elapsed after changing XSV28 to "1", the routine proceeds to step 182.

As a result of step 180, the duty control (feed back control) for the waste gate valve 31 waits the period of time T after the turbocharger operation is switched from "one-turbocharger-operation" to "two-turbocharger-operation". As a result of step 184, duty ratio DSV35 remains small (for example, zero) during stopping of the duty control for the waste gate valve 31. If steps 180 and 184 were not provided, the decrease in charging pressure which occurs immediately after switching to "two-turbocharger-operation" would be misjudged by the computer to be due to an excessive opening of the waste gate valve 31 (excessively large duty ratio DSV 35) and the solenoid valve would operate to close the waste gate valve 31. As a result, when the charging pressure reaches the objective pressure Po, it would overshoot Po due to the excessive bleed of the duty control solenoid valve 35. Step 180 prevents such overshoot of the charging pressure.

Then, at step 182, it is determined whether the instant throttle angle (opening degree of the throttle valve 4) is greater than 60°. As a result of this guard, the duty control by the waste gate valve 31 is performed only when the engine load is larger than a predetermined value.

Then, the routine proceeds to step 188. Steps 188, 190, and 194 operate to control the charging pressure to an objective charging pressure Po in "two-turbocharger-operation", which is equal to the objective pressure Pc in "one-turbocharger-operation". More particularly, at step 188, it is determined whether the instant charging pressure PM is greater than the objective charging pressure Po (for example, 1,300 mmHg). If PM is greater than Po, the routine proceeds to step 190 where the duty ratio DSV35 of the duty control solenoid valve 35 is decreased by a predetermined amount (for example, 2%) per cycle. When duty ratio DSV35 is decreased, the bleed amount of the solenoid valve 35 is decreased and the diaphragm pressure of the diaphragm actuator 9 is increased. As a result, the opening degree of the waste gate valve 31 is increased and the charging pressure is decreased. If PM is equal to or less than Po at step 188, the routine proceeds to step 194 via step 192, where the duty ratio DSV35 of the solenoid valve 35 is increased whereby the charging pressure PM is increased. The routine proceeds from steps 190 and 194 to step 146 (see FIG. 2).

To improve the characteristic at high altitudes, steps 186, 192, 196, 198, and 200 are added to the partial routine of FIG. 7. More particularly, when PM is equal to or less than the objective charging pressure at step 188, the routine proceeds to step 192, where it is determined whether or not flag YINITIAL is "1". If flag YINITIAL is "1", the cycle is a first cycle after the time period T has passed after a change in turbocharged engine operation to "two-turbocharger-operation" and the routine proceeds to step 196. At step 196, an initial duty ratio Sw for DSV35 is determined based on the instant atmospheric pressure AP. The map is determined such that the lower the altitude is, the more the initial duty ratio Sw is. Then, at step 198, duty ratio DSV35 is set to Sw. Then, at step 200, flag YINITIAL is reset to "0". Then, the routine proceeds to step 146 (see FIG. 2). In subsequent cycles, when the routine proceeds from 188 to step 192, the routine proceeds to step 194, because YINITIAL has been set to "0". As a result of steps 186, 192, 196, 198, and 200, the duty ratio DSV35 rises from Sw, when the charging pressure rises from the decreased pressure toward the objective charging pressure during the transition from "one-turbocharger-operation" to "two-turbocharger-operation". In this instance, steps 186, 192, 196, 198, and 200 constitute means for setting an initial duty ratio of the duty control solenoid valve 35 for controlling an opening degree of the waste gate valve 31 to a large duty ratio Sw on the basis of atmospheric pressure at high altitudes.

FIG. 8 illustrates the charging pressure characteristic during the transition. In "one-turbocharger-operation", the charging pressure is controlled by the duty control solenoid valve 32 (by control of the exhaust bypass valve 41), while in "two-turbocharger-operation", the charging pressure is controlled by the duty control solenoid valve 35 (by control of the waste gate valve 31).

After switching to "two-turbocharger-operation", duty control of the solenoid valve 35 is stopped for the predetermined period of time T, so that overshoot of the charging pressure over Po is prevented immediately after the switch.

Since atmospheric pressure is low at high altitudes, the difference between the objective pressure Po and atmospheric pressure at high altitudes is larger than the difference between the same objective pressure Po and atmospheric pressure at low altitudes. As a result, the duty ratio W2 of the duty control solenoid valve 35 for controlling the charging pressure to the objective pressure Po at high altitudes must be greater than the duty ratio W1 at low altitudes. Therefore, in the case where the control routine of the apparatus does not include steps 186, 192, 196, 198, and 200 of FIG. 7, it takes a longer period of time T2 for the duty ratio DSV35 to rise from 0% to the required duty ratio W2 at high altitudes than a period of time T1 at low altitudes. As a result, the charging pressure characteristic at high altitudes will be degraded as shown by broken line L2 in FIG. 8.

However, since steps 186, 192, 196, 198, and 200 are added to the routine of FIG. 7 in accordance with the third embodiment of the invention, the duty ratio DSV35 can start at Sw and can reach the required duty ratio W2 at high altitudes in a shorter period of time T1. As a result, the charging pressure can recover to the objective charging pressure Po more quickly as shown by one-dotted line L4 in FIG. 8. Line L4 approaches the characteristic at low altitudes which is shown by full line L1 in FIG. 8. As a result, the output characteristic at the transition from "one-turbocharger-operation" to "two-turbocharger-operation" is improved and a shock at the transition is decreased.

Figure 9:
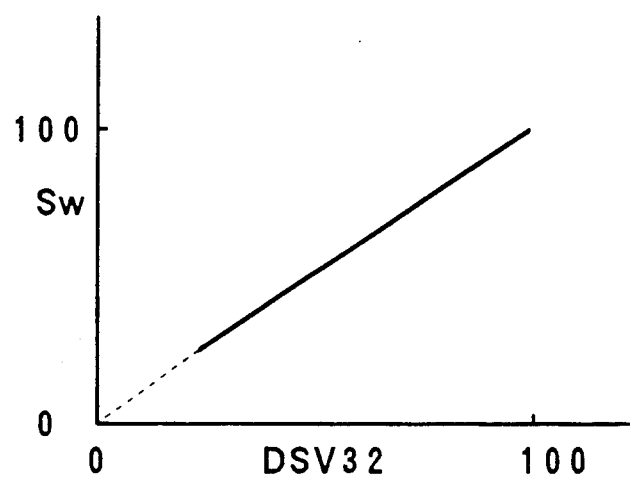
FIG. 9 is a graphical representation of the map used for determining an initial duty ratio of a duty control solenoid valve in accordance with a fourth embodiment of the invention.

The fourth embodiment of the invention relates to an alteration of the third embodiment, discussed above, and is illustrated in FIG. 9. More particularly, in accordance with the fourth embodiment, the map of step 196 in FIG. 7 is replaced by the map of FIG. 9. Since duty ratio DSV32 of the duty control solenoid valve 32 for controlling the opening degree of the exhaust bypass valve 41 changes in accordance with the atmospheric pressure AP, the initial duty ratio Sw of the duty control solenoid valve 35 can be determined based on an average value of duty ratio DSV32 at the last stage of the previous "one-turbocharger-operation" which is temporarily stored in the ROM. In this instance, steps 186, 192, 196 including the map of FIG. 9, 198, and 200 constitute means for setting an initial duty ratio of the duty control solenoid valve 35 for controlling an opening degree of the waste gate valve 31 to a large duty ratio Sw on the basis of a duty ratio of the solenoid valve 32 for operating the exhaust bypass valve 41 at high altitudes. Structures other than the map of FIG. 9 and operation of the fourth embodiment are the same as those of the third embodiment.

Figure 10:
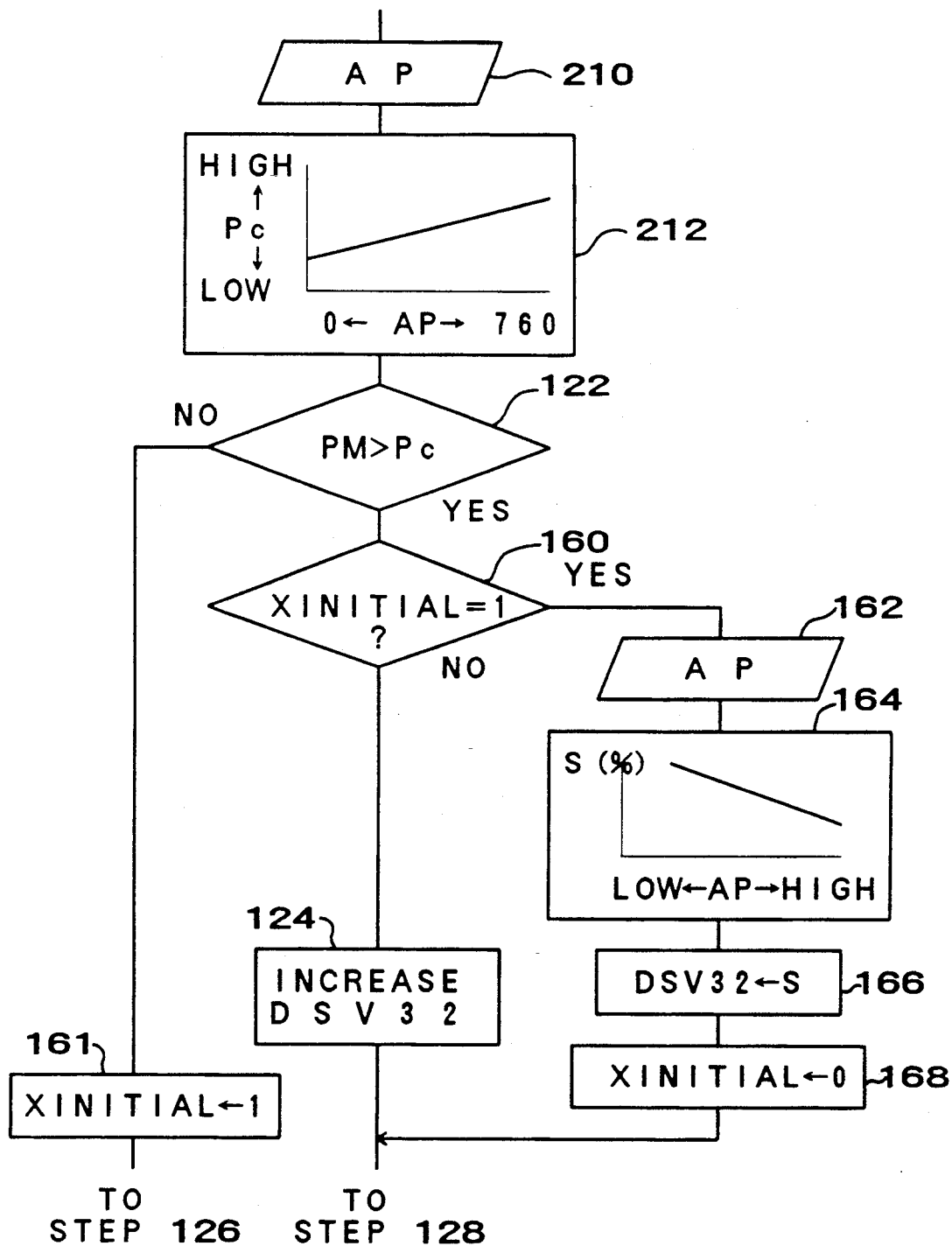
FIG. 10 is a partial flow chart of the control of an exhaust bypass valve in accordance with a fifth embodiment of the invention.
Figure 11:
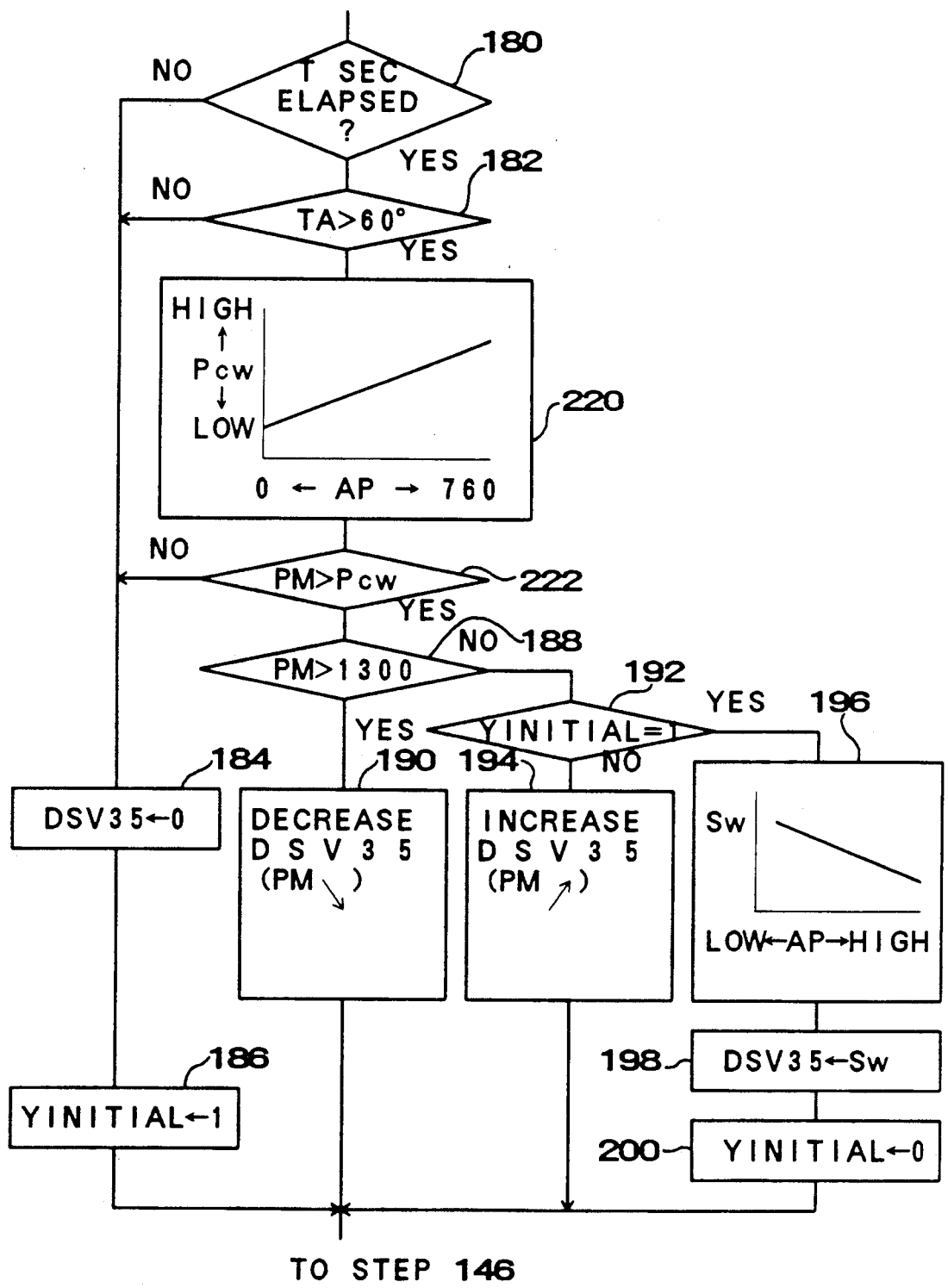
FIG. 11 is a partial flow chart of the control of a waste gate valve in accordance with the fifth embodiment of the invention.

The fifth embodiment of the invention is an improvement in the charging pressure control by the exhaust bypass valve 41 in "one-turbocharger-operation" and the charging pressure control by the waste gate valve 31 in "two-turbocharger-operation". More particularly, the fifth embodiment is an improvement of the first embodiment and the third embodiment, for making the charging pressure control apparatus operable even if the atmospheric pressure is very low and the intake pressure cannot rise to the feed back control beginning pressure. The routines belonging to the fifth embodiment are illustrated in FIG. 10 and FIG. 11. FIG. 10 is a routine made by adding steps 210 and 212 to the routine of FIG. 3 of the first embodiment, and the steps which are the same as those of FIG. 3 are denoted by the same reference numerals. FIG. 11 is a routine made by adding steps 220 and 222 to the routine of FIG. 7 of the third embodiment, and the steps which are the same as those of FIG. 7 are denoted by the same reference numerals.

In FIG. 10, the routine proceeds from step 118 to step 210 where atmospheric pressure AP is entered. Then, at step 212, the charging pressure feed back control beginning pressure Pc (in "one-turbocharger-operation") is determined based on the entered atmospheric pressure AP, using a map. In the map, it is predetermined that the lower the atmospheric pressure AP is (that is, the higher the altitude is), the lower the pressure Pc is. Then, the routine proceeds to step 122 and after that the same operation as in the first embodiment, discussed above, is performed.

In FIG. 11, the routine proceeds from step 182 to step 220 where feed back control beginning pressure Pcw (in "two-turbocharger-operation") is determined based on the atmospheric pressure AP, using a map. In the map, it is predetermined that the lower the atmospheric pressure AP is, the lower the pressure Pcw is. Then, the routine proceeds to step 222 where it is determined whether the instant charging pressure PM is higher than Pcw. If PM is equal to or less than Pcw, the routine proceeds to step 184. If PM is higher than Pcw, the routine proceeds to step 188, and after that the same operation as in the third embodiment, discussed above, is performed.

Figure 12:
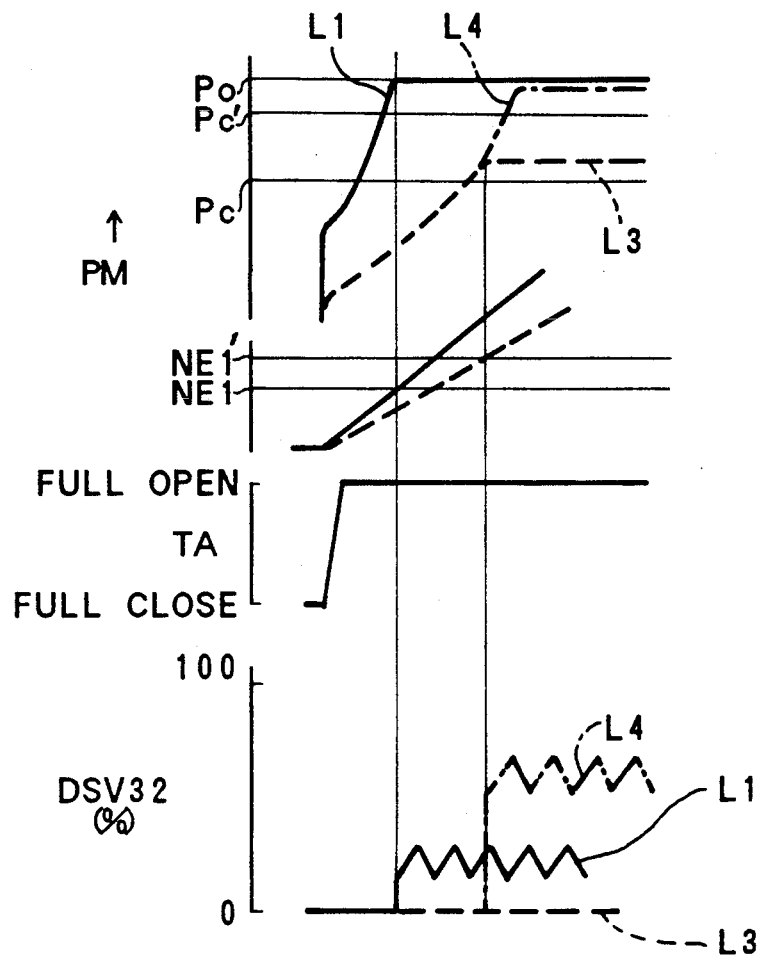
FIG. 12 is a graphical representation of the charging pressure control characteristic in accordance with the fifth embodiment.
Figure 15:
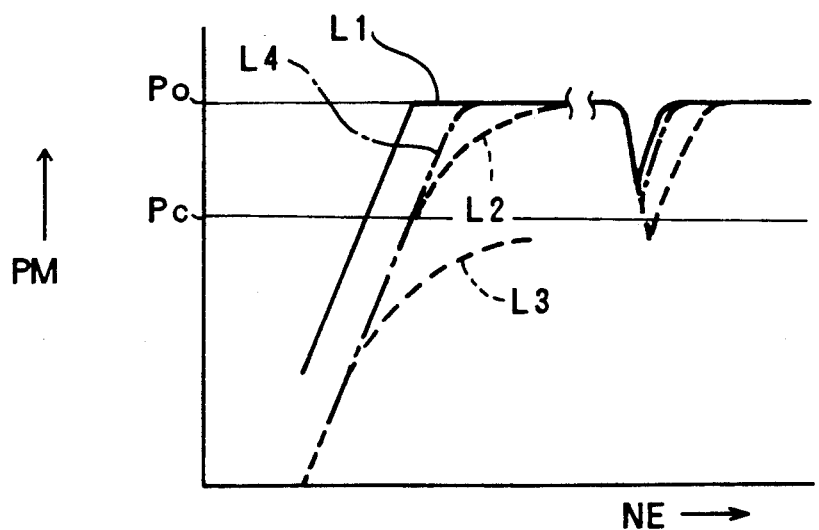
FIG. 15 is a graphical representation of a turbocharger characteristic.

FIG. 12 illustrates the charging pressure control characteristic in accordance with the fifth embodiment of the invention. At low altitudes, the intake pressure PM can easily rise to the feed back control beginning pressure Pc as shown by full line L1 in FIG. 12. Once Pc is reached, the intake pressure can be controlled to the objective charging pressure Po. However, at very high altitudes, the intake pressure cannot rise to the feed back control beginning pressure Pc determined for the low altitudes, as shown by broken line L3 in FIG. 12. In that event, the duty ratio DSV32 of the duty control solenoid valve 32 is maintained at zero. However, in accordance with the fifth embodiment, since the routine of FIG. 10 includes steps 210 and 212, the feed back control beginning pressure Pc is lowered according to the altitude and the intake pressure PM can rise to the thus lowered pressure Pc as shown by one-dotted chain line L4 in FIG. 12. Upon reaching the pressure Pc, the intake pressure PM can be controlled to the objective charging pressure Po independently of the atmospheric pressure. The same operation is obtained in "two-turbocharger-operation".

Figure 13:
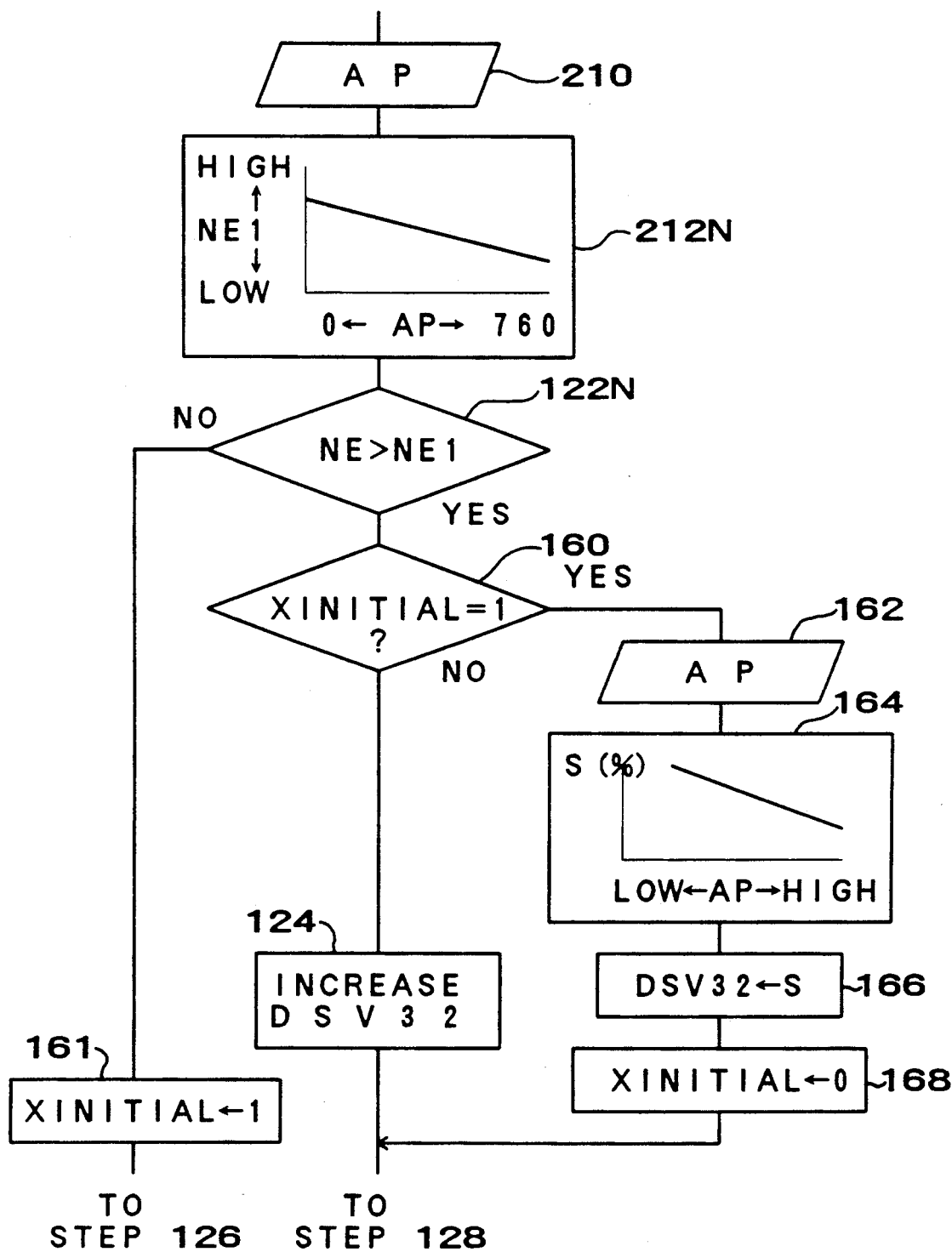
FIG. 13 is a partial flow chart of the control of an exhaust bypass valve in accordance with a sixth embodiment of the invention.

The sixth embodiment of the invention is similar to the fifth embodiment and is illustrated in FIGS. 13 and 14. The difference between the sixth embodiment and the fifth embodiment is that the beginning of feed back control is determined by engine rotational speeds NE1 and NE2 in the sixth embodiment, whereas the beginning of feed back control is determined by pressures Pc and Pcw in the fifth embodiment.

More particularly, in FIG. 13, the routine proceeds from step 118 to step 210 where atmospheric pressure AP is entered. Then, at step 212N, a charging pressure feed back control beginning engine speed N1 (in "one-turbocharger-operation") is determined based on the entered atmospheric pressure AP, using a map. In the map, it is predetermined that the lower the atmospheric pressure AP is (that is, the higher the altitude is), the higher the speed N1 is. Then, the routine proceeds to step 122N. If the instant engine speed NE is equal to or less than N1 at step 122N, the routine proceeds to step 161. If the engine speed NE is higher than NE1, the routine proceeds to step 160 and after that the same operation as in the first embodiment, discussed above, is performed.

In FIG. 14, the routine proceeds from step 182 to step 220N where feed back control beginning engine speed NE2 (in "two-turbocharger-operation") is determined based on the atmospheric pressure AP, using a map. In the map, it is predetermined that the lower the atmospheric pressure AP is, the higher the speed NE2 is. Then, the routine proceeds to step 222N where it is determined whether or not the instant engine speed NE is greater than NE2. If NE is equal to or less than NE2, the routine proceeds to step 184. If NE is greater than NE2, the routine proceeds to step 188, and after that the same operation as in the third embodiment, discussed above, is performed.

FIG. 12 also illustrates the charging pressure control characteristic in accordance with the sixth embodiment. NE1 at low altitudes corresponds to Pc at low altitudes, and NE1 at high altitudes (NE1') correspond to Pc at high altitudes (Pc'). Since the NE1 value is raised at high altitudes, the Pc value is lowered at high altitudes. As a result, the intake pressure PM can rise to the thus lowered Pc and then is controlled to the objective charging pressure Po.

Although the charging control by the waste gate valve has been explained on the twin turbocharger system, the same charging control as described above can be applied to a charging control for a single turbocharger system.

Although several embodiments of the invention have been described in detail above, those skilled in the art will appreciate that various modifications and alterations can be made to the particular embodiments shown without materially departing from the novel teachings and advantages of the invention. Accordingly, all such modifications and alterations are included within the spirit and scope of the present invention as defined by the following claims.

What is claimed is:

1. A charging pressure control apparatus for an internal combustion engine with a dual turbocharger system comprising:

a multi-cylinder internal combustion engine having at least one air intake and at least one exhaust outlet, wherein the engine includes first and second groups of cylinders;

an exhaust manifold connected with the at least one engine exhaust outlet, the exhaust manifold including a first portion connected to the first group of the cylinders and a second portion connected to the second group of the cylinders, the first portion and the second portion of the exhaust manifold being joined to each other with a connecting conduit;

a first turbocharger and a second turbocharger arranged in parallel with each other, each said turbocharger including a turbine and a turbine driven compressor, the turbines being connected to the engine exhaust outlet with the exhaust manifold and the compressors being connected to the air intake of the engine;

an air intake line including a first intake conduit connected with the first turbocharger compressor and a second intake conduit connected with the second turbocharger compressor, the air intake line being connected with the engine air intake;

an exhaust line including a first exhaust conduit connected with the first portion of the exhaust manifold, in which the first turbocharger turbine is installed, a second exhaust conduit connected with the second portion of the exhaust manifold, in which the second turbocharger turbine is installed;

an intake switching valve installed downstream of the second turbocharger compressor in the second intake conduit for opening and closing the second intake conduit;

an exhaust switching valve installed downstream of the second turbocharger turbine in the second exhaust conduit for opening and closing the second exhaust conduit;

an exhaust bypass conduit connecting a portion of the second exhaust conduit upstream of the exhaust switching valve with any one of a portion of the first exhaust conduit downstream of the first turbocharger turbine and a portion of the second exhaust conduit downstream of the exhaust switching valve;

an exhaust bypass valve installed in the exhaust bypass conduit for opening and closing the exhaust bypass conduit;

a first diaphragm actuator coupled to the exhaust bypass valve, the first diaphragm actuator including a diaphragm chamber to which a charging pressure is introduced and from which the charging pressure bleeds via a first duty control solenoid valve corresponding to a decrease in an opening degree of the exhaust bypass valve;

a waste gate valve installed in a passage bypassing the first turbocharger turbine;

a second diaphragm actuator coupled to the waste gate valve, the second actuator including a diaphragm chamber to which a charging pressure is introduced and from which the charging pressure bleeds via a second duty control solenoid valve, an increase in the duty ratio of the second duty control solenoid valve corresponding to a decrease in an opening degree of the waste gate valve;

atmospheric pressure detecting means for detecting atmospheric pressure which varies according to altitude; and duty control condition changing means for changing a duty control condition of at least one of the fist duty control solenoid valve and the second duty control solenoid valve in accordance with an atmospheric pressure detected by the atmospheric pressure detecting means, the duty control condition changing means including means for setting an initial duty ratio of the first duty control solenoid valve to a greater value at relatively high altitudes than at relatively low altitudes for controlling an opening degree of the exhaust bypass valve.

2. A charging pressure control apparatus for an internal combustion engine with a dual turbocharger system comprising:

a multi-cylinder internal combustion engine having at least one air intake and at least one exhaust outlet, wherein the engine includes first and second groups of cylinders;

an exhaust manifold connected with the at least one engine exhaust outlet, the exhaust manifold including a first portion connected to the first group of the cylinders and a second portion connected to the second group of the cylinders, the first portion and the second portion of the exhaust manifold being joined to each other with a connecting conduit;

a first turbocharger and a second turbocharger arranged in parallel with each other, each said turbocharger including a turbine and a turbine driven compressor, the turbines being connected to the engine exhaust outlet with the exhaust manifold and the compressors being connected to the air intake of the engine;

an air intake line including a first intake conduit connected with the first turbocharger compressor and a second intake conduit connected with the second turbocharger compressor, the air intake line being connected with the engine air intake;

an exhaust line including a first exhaust conduit connected with the first portion of the exhaust manifold, in which the first turbocharger turbine is installed, a second exhaust conduit connected with the second portion of the exhaust manifold, in which the second turbocharger turbine is installed;

an intake switching valve installed downstream of the second turbocharger compressor in the second intake conduit for opening and closing the second intake conduit;

an exhaust switching valve installed downstream of the second turbocharger turbine in the second exhaust conduit for opening and closing the second exhaust conduit;

an exhaust bypass conduit connecting a portion of the second exhaust conduit upstream of the exhaust switching valve with any one of a portion of the first exhaust conduit downstream of the first turbocharger turbine and a portion of the second exhaust conduit downstream of the exhaust switching valve;

an exhaust bypass valve installed in the exhaust bypass conduit for opening and closing the exhaust bypass conduit;

a first diaphragm actuator coupled to the exhaust bypass valve, the first diaphragm actuator including a diaphragm chamber to which a charging pressure is introduced and from which the charging pressure bleeds via a first duty control solenoid valve corresponding to a decrease in an opening degree of the exhaust bypass valve;

a waste gate valve installed in a passage bypassing the first turbocharger turbine;

a second diaphragm actuator coupled to the waste gate valve, the second actuator including a diaphragm chamber to which a charging pressure is introduced and from which the charging pressure bleeds via a second duty control solenoid valve, an increase in the duty ratio of the second duty control solenoid valve corresponding to a decrease in an opening degree of the waste gate valve;

atmospheric pressure detecting means for detecting atmospheric pressure which varies according to altitude;

duty control condition changing means for changing a duty control condition of at least one of the fist duty control solenoid valve and the second duty control solenoid valve in accordance with an atmospheric pressure detected by the atmospheric pressure detecting means; and means for feed back controlling the exhaust bypass valve, the duty control condition changing means including means for delaying a timing of a beginning of a feed back control of the exhaust bypass valve at relatively high altitudes compared to at relatively low altitudes.

3. An apparatus according to claim 3, wherein the timing delaying means includes means for selecting a higher fed back control beginning pressure at relatively high altitudes than at relatively low altitudes.

4. An apparatus according to claim 2, wherein the duty control condition changing means includes means for setting an initial duty ratio of the second duty control solenoid valve to a greater value at relatively high altitudes than at relatively low altitudes for controlling an opening degree of the waste gate valve.

5. An apparatus according to claim 5, wherein the initial duty ratio setting means sets the initial duty ratio of the second duty control solenoid valve based on the atmospheric pressure detected by the atmospheric pressure detecting means.

6. An apparatus according to claim 3, further comprising means for blocking duty control of the second duty control solenoid valve for a predetermined period of time after a switch from a one-turbocharger-operation to a two-turbocharger-operation.

7. An apparatus according to claim 5, wherein the initial duty ratio setting means sets the initial duty ratio of the second duty control solenoid valve based on an instant duty ratio of the first duty control selenoid valve stored in a random access memory of an electronic control unit.

8. A charging pressure control apparatus for an internal combustion engine with a dual turbocharger system comprising:

a multi-cylinder internal combustion engine having at least one air intake and at least one exhaust outlet, wherein the engine includes first and second groups of cylinders;

an exhaust manifold connected with the at least one engine exhaust outlet, the exhaust manifold including a first portion connected to the first group of the cylinders and a second portion connected to the second group of the cylinders, the first portion and the second portion of the exhaust manifold being joined to each other with a connecting conduit;

a first turbocharger and a second turbocharger arranged in parallel with each other, each said turbocharger including a turbine and a turbine driven compressor, the turbines being connected to the engine exhaust outlet with the exhaust manifold and the compressors being connected to the air intake of the engine;

an air intake line including a first intake conduit connected with the first turbocharger compressor and a second intake conduit connected with the second turbocharger compressor, the air intake line being connected with the engine air intake;

an exhaust line including a first exhaust conduit connected with the first portion of the exhaust manifold, in which the first turbocharger turbine is installed, a second exhaust conduit connected with the second portion of the exhaust manifold, in which the second turbocharger turbine is installed;

an intake switching valve installed downstream of the second turbocharger compressor in the second intake conduit for opening and closing the second intake conduit;

an exhaust switching valve installed downstream of the second turbocharger turbine in the second exhaust conduit for opening and closing the second exhaust conduit;

an exhaust bypass conduit connecting a portion of the second exhaust conduit upstream of the exhaust switching valve with any one of a portion of the first exhaust conduit downstream of the first turbocharger turbine and a portion of the second exhaust conduit downstream of the exhaust switching valve;

an exhaust bypass valve installed in the exhaust bypass conduit for opening and closing the exhaust bypass conduit;

a first diaphragm actuator coupled to the exhaust bypass valve, the first diaphragm actuator including a diaphragm chamber to which a charging pressure is introduced and from which the charging pressure bleeds via a first duty control solenoid valve corresponding to a decrease in an opening degree of the exhaust bypass valve;

a waste gate valve installed in a passage bypassing the first turbocharger turbine;

a second diaphragm actuator coupled to the waste gate valve, the second actuator including a diaphragm chamber to which a charging pressure is introduced and from which the charging pressure bleeds via a second duty control solenoid valve, an increase in the duty ratio of the second duty control solenoid valve corresponding to a decrease in an opening degree of the waste gate valve;

atmospheric pressure detecting means for detecting atmospheric pressure which varies according to altitude;

duty control condition changing means for changing a duty control condition of at least one of the fist duty control solenoid valve and the second duty control solenoid valve in accordance with an atmospheric pressure detected by the atmospheric pressure detecting means; and means for feedback controlling charging pressure, the duty control condition changing means including means for lowering a charging pressure feed back control beginning pressure at relatively high altitudes.

9. A charging pressure control apparatus for an internal combustion engine with a dual turbocharger system comprising:

a multi-cylinder internal combustion engine having at least one air intake and at least one exhaust outlet, wherein the engine includes first and second groups of cylinders;

an exhaust manifold connected with the at least one engine exhaust outlet, the exhaust manifold including a first portion connected to the first group of the cylinders and a second portion connected to the second group of the cylinders, the first portion and the second portion of the exhaust manifold being joined to each other with a connecting conduit;

a first turbocharger and a second turbocharger arranged in parallel with each other, each said turbocharger including a turbine and a turbine driven compressor, the turbines being connected to the engine exhaust outlet with the exhaust manifold and the compressors being connected to the air intake of the engine;

an air intake line including a first intake conduit connected with the first turbocharger compressor and a second intake conduit connected with the second turbocharger compressor, the air intake line being connected with the engine air intake;

an exhaust line including a first exhaust conduit connected with the first portion of the exhaust manifold, in which the first turbocharger turbine is installed, a second exhaust conduit connected with the second portion of the exhaust manifold, in which the second turbocharger turbine is installed;

an intake switching valve installed downstream of the second turbocharger compressor in the second intake conduit for opening and closing the second intake conduit;

an exhaust switching valve installed downstream of the second turbocharger turbine in the second exhaust conduit for opening and closing the second exhaust conduit;

an exhaust bypass conduit connecting a portion of the second exhaust conduit upstream of the exhaust switching valve with any one of a portion of the first exhaust conduit downstream of the first turbocharger turbine and a portion of the second exhaust conduit downstream of the exhaust switching valve;

an exhaust bypass valve installed in the exhaust bypass conduit for opening and closing the exhaust bypass conduit;

a first diaphragm actuator coupled to the exhaust bypass valve, the first diaphragm actuator including a diaphragm chamber to which a charging pressure is introduced and from which the charging pressure bleeds via a first duty control solenoid valve corresponding to a decrease in an opening degree of the exhaust bypass valve;

a waste gate valve installed in a passage bypassing the first turbocharger turbine;

a second diaphragm actuator coupled to the waste gate valve, the second actuator including a diaphragm chamber to which a charging pressure is introduced and from which the charging pressure bleeds via a second duty control solenoid valve, an increase in the duty ratio of the second duty control solenoid valve corresponding to a decrease in an opening degree of the waste gate valve;

atmospheric pressure detecting means for detecting atmospheric pressure which varies according to altitude;

duty control condition changing means for changing a duty control condition of at least one of the fist duty control solenoid valve and the second duty control solenoid valve in accordance with an atmospheric pressure detected by the atmospheric pressure detecting means; and means for feedback controlling charging pressure, the duty control condition changing means includes means for raising a charging pressure feed back control beginning engine speed at relatively high altitudes.

10. An apparatus according to any one of claims 2, 8 or 9, further comprising:

an intake bypass conduit connecting a portion of the second intake conduit downstream of the second turbocharger compressor and upstream of the intake switching valve with a portion of the first intake passage; and an intake bypass valve installed in the intake bypass conduit for opening and closing the intake bypass conduit.

11. An apparatus according to any one of claims 2, 8 or 9, further comprising:

an intake switching valve bypass conduit for bypassing the intake switching valve; and a one-way valve installed in the intake switching valve bypass conduit for permitting air to flow solely from an upstream portion of the intake air switching valve to a downstream portion of the intake air switching valve.

* * * * *